United States Patent
Hsu et al.

(10) Patent No.: US 8,315,433 B2
(45) Date of Patent: Nov. 20, 2012

(54) OBSTACLE DETERMINATION SYSTEM AND METHOD IMPLEMENTED THROUGH UTILIZING BIRD'S-EYE-VIEW IMAGES

(75) Inventors: Tzu-Chien Hsu, Lugang (TW); Chia-Tseng Chen, Lugang (TW)

(73) Assignee: Automotive Research & Test Center, Changhua County (TW)

( * ) Notice: Subject to any disclaimer, the term of this patent is extended or adjusted under 35 U.S.C. 154(b) by 644 days.

(21) Appl. No.: 12/588,137

(22) Filed: Oct. 6, 2009

(65) Prior Publication Data
US 2011/0026771 A1 Feb. 3, 2011

(30) Foreign Application Priority Data
Jul. 31, 2009 (TW) ................. 98125791 A

(51) Int. Cl.
*G06K 9/00* (2006.01)
(52) U.S. Cl. ......................... 382/104; 382/103
(58) Field of Classification Search .................. None
See application file for complete search history.

(56) References Cited

U.S. PATENT DOCUMENTS

| | | | |
|---|---|---|---|
| 2006/0029255 A1* | 2/2006 | Ozaki | 382/104 |
| 2008/0231710 A1* | 9/2008 | Asari et al. | 348/187 |
| 2009/0097708 A1* | 4/2009 | Mizuta | 382/103 |

* cited by examiner

*Primary Examiner* — Claire X Wang
(74) *Attorney, Agent, or Firm* — Rosenberg, Klein & Lee

(57) ABSTRACT

A technology of determining obstacles around a vehicle through utilizing bird's-eye-view images; wherein, a plurality of image fetching devices disposed in various positions of said vehicle fetch a plurality of images around said vehicle, said images of two adjacent regions contain at least an overlapped region; an image processor transforms said images into said respective independent bird's-eye-view images; and an obstacle detection unit compares said overlapped region in said independent bird's-eye-view images of two adjacent regions, so as to obtain their correlations, and existence of said obstacle is determined based on said correlations. Moreover, a correspondence table is set up containing a set of space transformation information based on vehicle driving condition information. Therefore, a surrounding bird's-eye-view image of an appropriate visual angle can be produced quickly and a position of said obstacle is marked on said surrounding bird's-eye-view image.

14 Claims, 8 Drawing Sheets

OBSTACLE DETERMINATION SYSTEM AND METHOD IMPLEMENTED THROUGH UTILIZING BIRD'S-EYE-VIEW IMAGES

BACKGROUND OF THE INVENTION

1. Field of the Invention

The present invention relates to an obstacle determination system and method, and in particular to an obstacle determination system and method that can be utilized in achieving safe driving of a vehicle.

2. The Prior Arts

With the decreasing cost of camera, presently, camera-related photographic apparatuses are widely utilized in assisting safe vehicle driving. However, most of them are only capable of providing images around a vehicle passively in assisting driver of a vehicle in avoiding occurrences of accidents. Since it is rather difficult for a driver to monitor a plurality of display screens simultaneously, and the scope of visual dead angle (blind spot) is still rather large for applying conventional planar images in assisting driving and parking of a vehicle. Therefore, presently, a virtual surrounding bird's-eye-view imaging system is developed and produced, that can overlook from the top of the vehicle through a plurality of cameras installed around the vehicle, so that a plurality of images obtained are combined into a top view image having a transformed visual angle, that is more suitable for and compatible with the visual habit of human eyes, and that can be utilized to overcome the shortcomings of visual dead angles.

However, usually, in transforming a planar image into a surrounding bird's-eye-view image for an ordinary surrounding bird's-eye-view imaging system, since a plurality of images have to be combined at the same time, therefore, in case that an object of a certain height appears in the overlapped region, then this object can not appear on the surrounding images due to the dead angles of image stitching. Therefore, this kind of existing surrounding imaging technology still has much room for improvements.

In order to overcome the shortcomings of this kind of surrounding imaging technology, in the conventional technology, radars or ultrasonic devices are utilized to detect the existence of obstacles, then the image thus obtained are stitched with the images taken by cameras, and when an obstacle at a stitched position of the images is detected, an audio or visual alarm will be issued to remind the driver that the obstacle exists in that position. By way of example, in a Japanese patent publication No. JP 2007041791 (A) is disclosed a bird's-eye-view image displaying system and method. Wherein, a plurality of cameras installed on a vehicle are used to obtain images around a vehicle, and then the images thus obtained are stitched into a surrounding bird's-eye-view image, and from this image, it can be known if an obstacle exists in front, rear, left side, or right side of a vehicle. In order to overcome the problem that an obstacle of a certain height is rather difficult to appear or indicate at a stitched position of surrounding images, four ultrasonic devices are utilized in that patent case to detect the dead angle regions. Though, this kind of approach is able to overcome this problem, yet it could increase the overall cost of the system for utilizing ultra sonic devices.

In addition, in the prior art, in a two-dimensional surrounding bird's-eye-view imaging system, the virtual viewpoint is set at a fixed point above the vehicle, so the scopes of the bird's-eye-view image in response to the virtual viewpoint can't be changed with driving condition. However, in moving forward, backward or turning around a corner of a vehicle, the scopes of fields of view of an imaging region in the vehicle moving direction are different as dictated by the actual requirement of a vehicle driver. Yet, in the prior art, only the bird's-eye-view images of a fixed virtual visual angle are provided, that can hardly fulfill the requirement of a vehicle driver.

SUMMARY OF THE INVENTION

In view of the problems and shortcomings of the prior art, the present invention discloses an obstacle determination system and method implemented through utilizing bird's-eye-view images, so as to overcome the problems of the prior art.

A major objective of the present invention is to provide an obstacle determination system and method implemented through utilizing bird's-eye-view images. Wherein, two bird's-eye-view images having overlapped regions are obtained, and the correlations of the images of the overlapped regions are compared in determining the emergence position of an obstacle of a certain height.

Another objective of the present invention is to provide an obstacle determination system and method implemented through utilizing bird's-eye-view images. Wherein, bird's-eye-view images are utilized directly in determining the position of an obstacle without having to acquire additional obstacle detection devices, such as radars or ultrasonic devices, so as to reduce production/assembly cost.

A yet another objective of the present invention is to provide an obstacle determination system and method implemented through utilizing bird's-eye-view images. Wherein, upon inputting signals of the images obtained, a correspondence table is utilized to perform quick transformation, so as to save system calculation time.

A further objective of the present invention is to provide an obstacle determination system and method implemented through utilizing bird's-eye-view images through utilizing bird's-eye-view images. Wherein, vehicle driving conditions are utilized in cooperation with a correspondence table, that specifies the correspondence between a steering-wheel-turning angle and a virtual-camera-overlooking angle, so as to output various surrounding bird's-eye-view images, hereby providing various bird's-eye-view images of different angles to the driver of a vehicle for safe driving.

A yet another objective of the present invention is to provide an obstacle determination system and method implemented through utilizing bird's-eye-view images. Wherein, the surrounding bird's-eye-view images having variable visual angles are utilized in cooperation with an obstacle determination technology, hereby providing images of more flexible obstacle determination scopes and bird's eye-view fields of view to a vehicle driver, when he back-ups or makes a turn of a vehicle.

In order to achieve the above-mentioned objective, the present invention provides an obstacle determination system and method implemented through utilizing bird's-eye-view images, comprising: a plurality of image fetching devices; an image processor; and an obstacle detection unit. Wherein, the plurality of image fetching devices are installed on a vehicle for fetching and obtaining images; then the image processor is used to transform the images thus obtained into a plurality of independent bird's-eye-view images; subsequently, the obstacle detection unit is used to compare the overlapped regions in independent bird's-eye-view images of two adjacent regions in calculating and obtaining a correlation coefficient of the overlapped region, and determine if an obstacle does exist in the overlapped region; and finally, the image processor is used to combine the plurality of bird's-eye-view images into a vehicle surrounding bird's-eye-view image, and when detecting that an obstacle does exist in the photographed region, marking image of the obstacle on the surrounding bird's-eye-view image of a vehicle, so as to inform and remind the vehicle driver of the existence of the obstacle.

Moreover, the present invention provides an obstacle determination system and method implemented through utilizing bird's-eye-view images, comprising the following steps: firstly, fetching signals of the vehicle and a plurality of images surrounding the vehicle, wherein the images of the adjacent regions include an overlapped region, and selecting a correspondence table of space transformation information based on the steering-wheel-turning-angle signal, in preparing for transformation into surrounding bird's-eye-view images; next, transforming the images of the vehicle into the respective independent bird's-eye-view images; then, determining correlations for overlapped regions in the independent bird's-eye-view images of two adjacent regions; subsequently, determining whether an obstacle exists in the overlapped region based on the magnitude of the correlation; and finally, in case that an obstacle exists in the overlapped region, then marking image of this obstacle onto the surrounding bird's-eye-view image, meanwhile, adjusting the visual angle of the bird's-eye-view image and changing the scope of obstacle detection as based on the steering-wheel-turning-angle signal.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed descriptions with reference to the attached drawings.

In the present invention, the major technical means utilized is to transform the images taken by various different cameras into independent bird's-eye-view images, then, images of overlapped regions in the independent bird's-eye-view images of two adjacent regions are compared to obtain their correlations. In case that the result of comparison indicates that the correlation is high, then it is determined that there does not exist any obstacle having a certain height in that overlapped region; otherwise, in case that the correlation is low, then it is determined that obstacles of a certain height does exist in that overlapped region. In this way, the existence of obstacles, their position and distance relative to a vehicle can be determined accurately.

Figure 1:
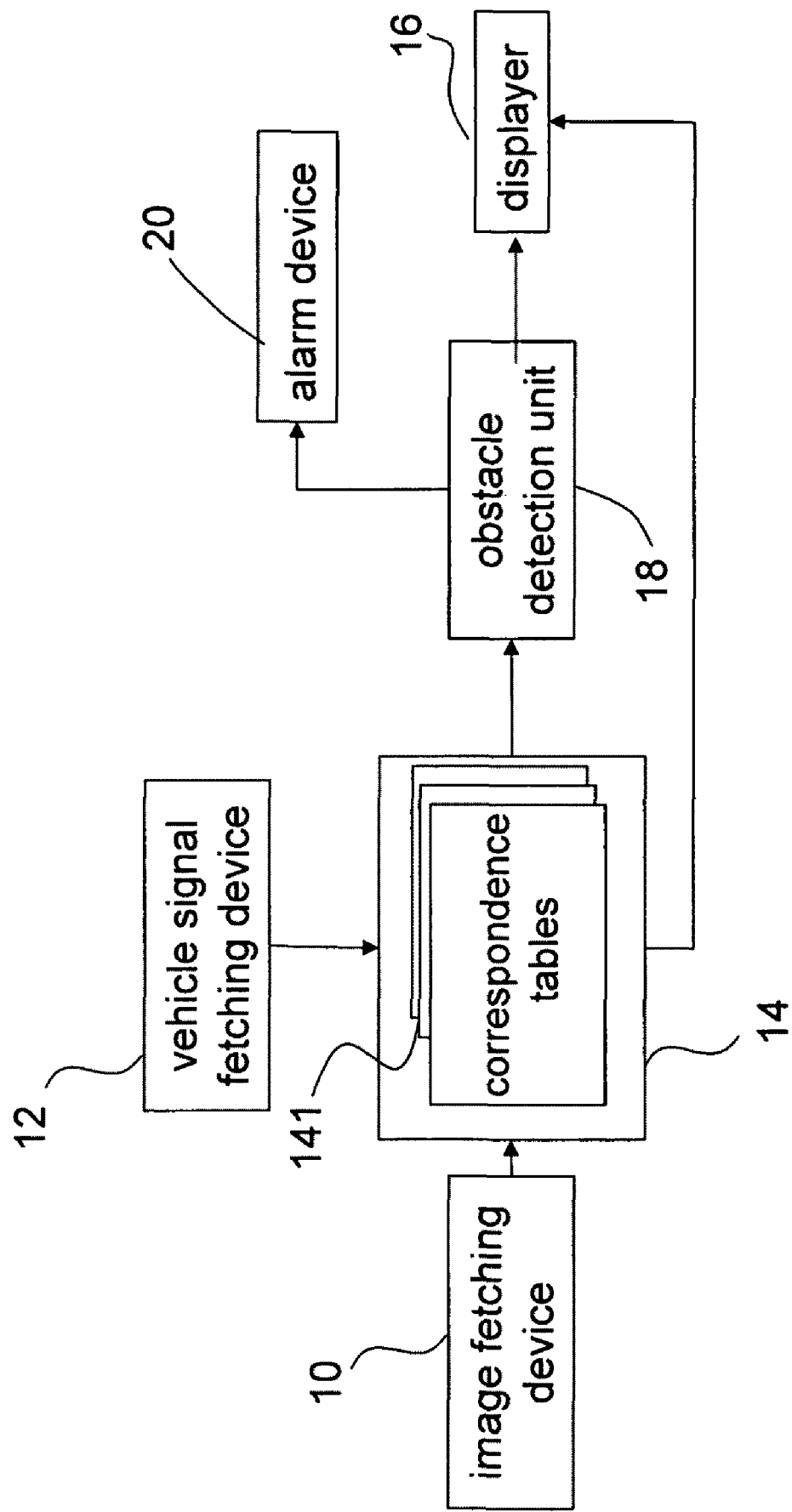
FIG. 1 is a system block diagram of an obstacle determination system implemented through utilizing bird's-eye-view images according to an embodiment of the present invention.

Firstly, refer to FIG. 1 for a system block diagram of an obstacle determination system implemented through utilizing bird's-eye-view images according to an embodiment of the present invention. In the present embodiment, six image fetching devices 10 are installed on a vehicle to fetch images around a vehicle. Wherein, for the images fetched by two adjacent image fetching devices 10, there exists a partly overlapped region of images, and that will be referred to as an overlapped region in the following. In the present invention, the image fetching device 10 can be a charge-coupled-display (CCD) camera or a compOsite metal-oxide-semiconductor (CMOS) camera. Also, in the present embodiment, a vehicle signal fetcher 12 is provided to obtain information about vehicle driving conditions. A vehicle signal includes: a steering-wheel-turning-angle signal, a vehicle speed signal, or a gear-shift signal. Then, an image processor 14 is used to receive data provided by original images and the vehicle signals. In the present embodiment, the steering-wheel-turning-angle signal is mainly utilized to determine the vehicle turn-around condition. Therefore, based on the steering-wheel-turning-angle signal of the vehicle, an image processor 14 may select a correct and suitable correspondence table 141 in proceeding with image space transformation. Wherein, the correspondence table 141 is set up in advance before the execution of the present embodiment, that contains space transformation information between a camera position and a steering-wheel-turning angle; meanwhile, the correspondence table 141 may also contain information relating to image distortion correction, image perspective transformation, and image stitching. Therefore, original images can be transformed into surrounding bird's-eye-view images based on various visual angles through the correspondence table at fast speed. As such, the image processor 14 is used to process the original image by means of the correspondence table 141, and then output a surrounding bird's-eye-view image based on an appropriate virtual visual angle. Then, the image is output to a displayer 16 in displaying the vehicle driving assistance lines or parking assistance lines around the vehicle.

In order to detect the obstacles around a driving vehicle, in the present invention, an image processor 14 is used to transform and obtain an overall surrounding bird's-eye-view image, in addition, six original images must be transformed separately into six independent bird's-eye-view images; then, images of overlapped regions are compared to obtain the correlation of images of overlapped regions in the independent bird's-eye-view images of two adjacent regions, hereby realizing the obstacle detection means. Wherein, in case that the correlation is high, then it means that an obstacle of a certain height does not exist in the overlapped region; on the contrary, in case that the correlation is low, then it means that there does exist at least one obstacle of certain height in the overlapped region. In the present embodiment, the image of obstacles detected is displayed in the surrounding bird's-eye-view image. Moreover, an alarm device 20, such as a light-emitting-diode (LED), a buzzer or a loudspeaker may further be installed, and that is used to send out alarm signals in reminding the driver to pay attention to the obstacles.

In the following, the technical means of comparing images of the overlapping regions in the independent bird's-eye-view images of two adjacent regions in determining the existence of obstacles are described in further detail. In the prior art, in this respect, at least four original images of the surroundings of a vehicle are first fetched, then an overlooking surrounding bird's-eye-view image is obtained through the processing and stitching done by an image processor. However, in the image calculation process, the ground is treated as an even plane, namely, an object of a certain height is treated as a planar object to proceed with image processing. Therefore, the shortcoming of the prior art is that, in transforming into a bird's-eye-view image, the image of an object having a certain height will be distorted, thus a accurate surrounding bird's-eye-view image can not be obtained. However, in the present invention, the characteristic of distortion of bird's-eye-view image is utilized in realizing the technology of obstacle detection.

Figure 2C:
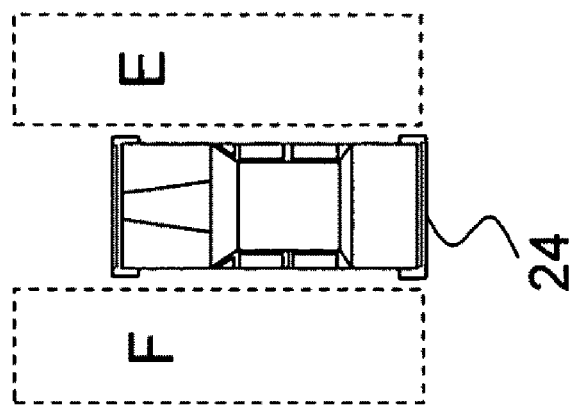
FIGS. 2 (a) to 2 (e) are schematic diagrams respectively of various different image-fetching-regions around a vehicle according to an embodiment of the present invention.
Figure 2B:
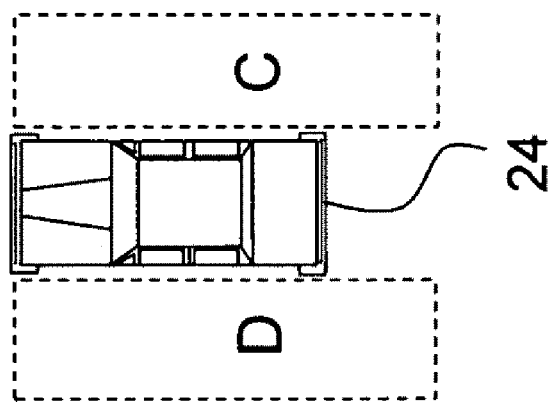
Figure 2A:
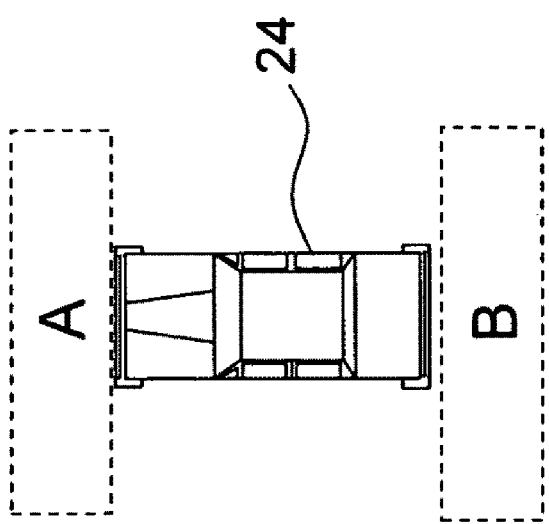
Figure 2E:
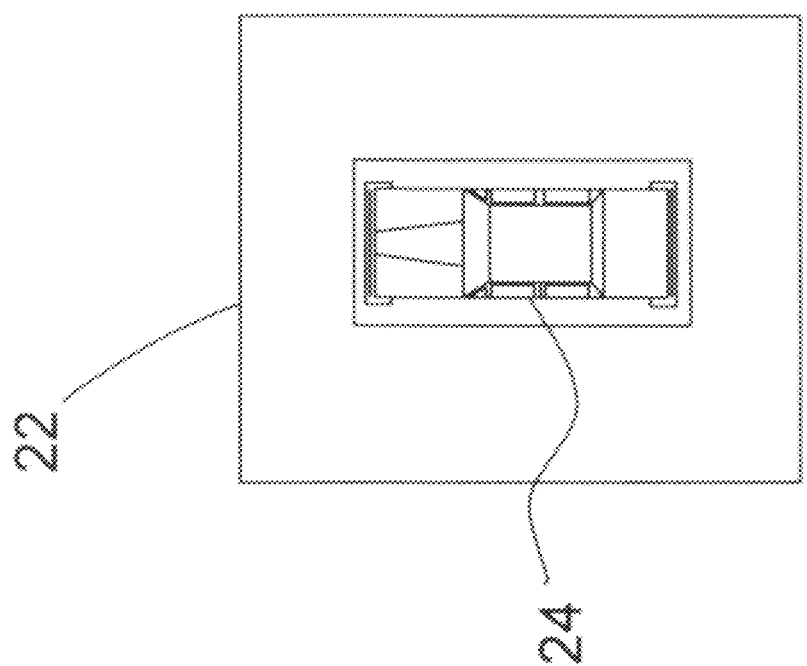

In the present invention, six image fetching devices 10 are provided to fetch the images of six regions around a vehicle, then the images thus obtained are transformed and stitched into a surrounding bird's-eye-view image 22 through an image processor 14, wherein, the image fetching device 10 is a camera. Refer to FIG. 2(a) for a schematic diagram of various different image-fetching-regions of a vehicle according to an embodiment of the present invention. In the present invention, a first camera and a second camera installed on a vehicle 24 are utilized to fetch images of a region A and region B in front of and in rear of a vehicle; a third camera and a fourth camera are utilized to fetch images of a region C and region D on the front left side and front right side a vehicle 24, as shown in FIG. 2(b); and a fifth camera and a sixth camera are utilized to fetch images of a region E and region F on the rear left side and rear right side a vehicle, as shown in FIG. 2(c). Wherein, overlapped regions of images exist for every two adjacent regions, as shown in slanted line regions 211, 212, 213, 214, 215, 216 of FIG. 2(d), and these are the regions used for detecting the existence of obstacles, and the images of the overlapped regions will undergo images processing & stitching to obtain a surrounding bird's-eye-view image of a vehicle 24 having its surrounding region 22 as shown in FIG. 2(e).

Figure 2D:
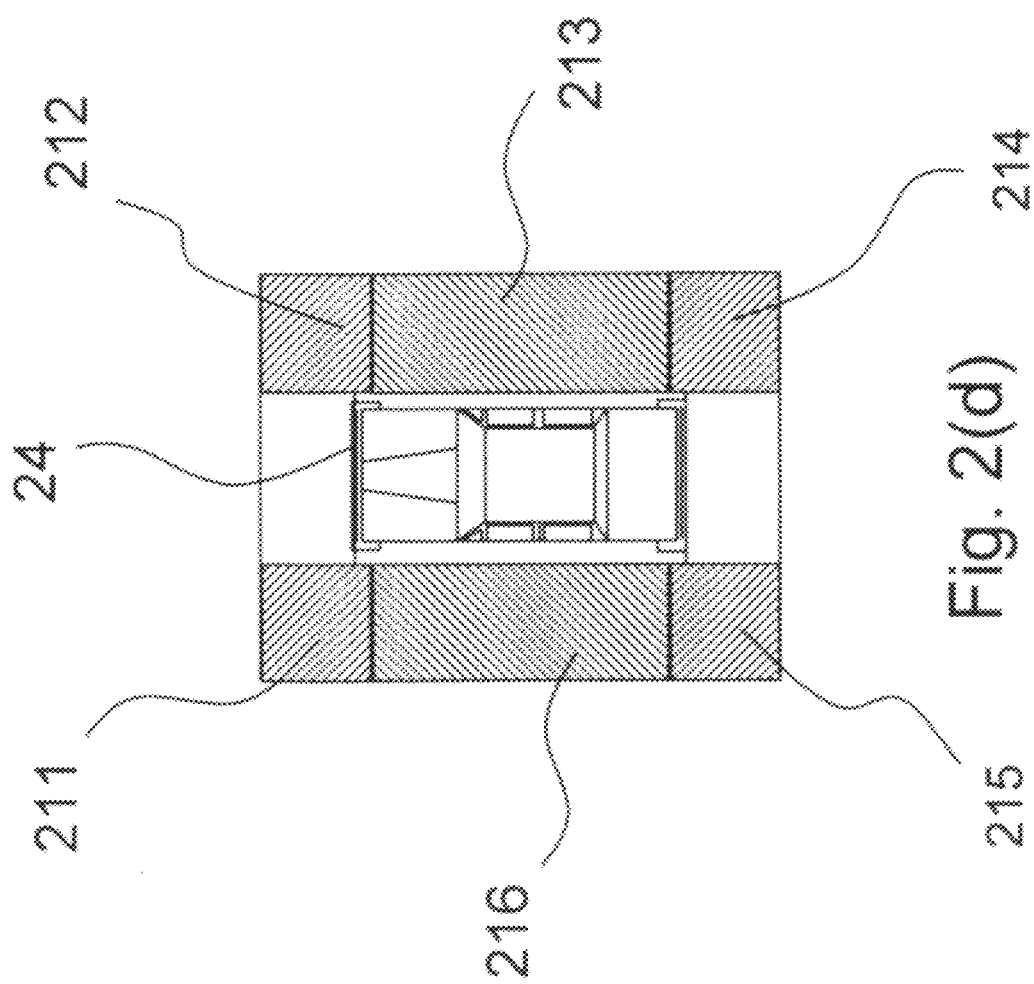
Figure 3:
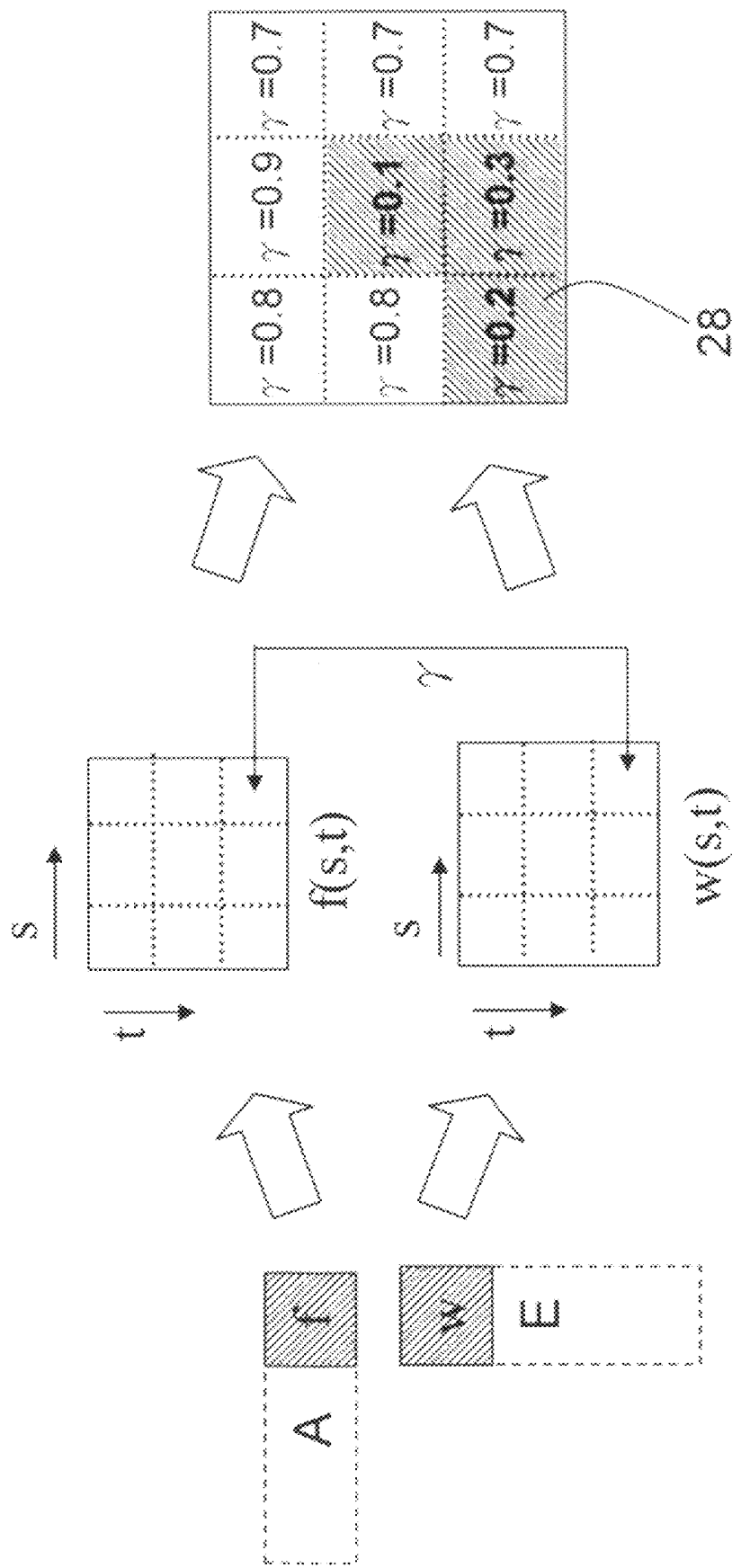
FIG. 3 is a schematic diagram of calculating the correlation coefficients of images of overlapped regions according to an embodiment of the present invention.

Subsequently, the above-mentioned original images of regions A,B,C,D,E,F are transformed into the respective independent bird's-eye-view images by an image processor 14, then, an obstacle detection unit 18 is used to compare images of the overlapped regions in the bird's-eye-view images of two adjacent regions in determining their correlations. Then, the independent bird's-eye-view image for region A of FIG. 2(a) and the independent bird's-eye-view image for region E of FIG. 2(c) are taken as an example for explanation. Thus region A and region E will contain the same overlapped region 212 as shown in FIG. 2(d). Refer to FIG. 3) for a schematic diagram of calculating the correlation coefficients of images of overlapped regions according to an embodiment of the present invention. As shown in FIG. 3, f(s,t) represents the gray level value for an image of the overlapped region of region A, and w(s,t) represents the gray level value for an image of the overlapped region of region E. The image processor 14 is used to divide the overlapped region into 9 sub-regions, then calculate the correlation coefficient γ of gray level values for the corresponding sub-regions of the two overlapped regions according to the following formula:

$$\gamma = \frac{\sum_s \sum_t [f(s,t)-\bar{f}][w(s,t)-\bar{w}]}{\left\{ \sum_s \sum_t [f(s,t)-\bar{f}]^2 \sum_s \sum_t [w(s,t)-\bar{w}]^2 \right\}^{1/2}}$$

wherein $\bar{f}$ and $\bar{w}$ are the average gray level values for images of the overlapped regions of region A and region E respectively. The meaning of this formula is to calculate the difference of gray level value for every single point in the same overlapped region in the two bird's-eye-view images, and accumulate the difference for all single points to obtain a correlation coefficient γ for the two adjacent bird's-eye-view images. In case that the images of overlapped regions for the two adjacent bird's-eye-view images are exactly the same, then, their correlation coefficient is 1; otherwise, in case that the images of overlapped regions for the two adjacent bird's-eye-view images are entirely not the same, then, their correlation coefficient is 0. In this respect, a threshold value of 0.5 of correlation coefficient for determining the existence of obstacles is taken as an example, in this case, if the correlation coefficient is less than this threshold value, then it means that an obstacle exists in the sub-region, such as in sub-region 28 of FIG. 3, since its correlation coefficient is less than 0.5, then it is determined that obstacle does exist in region 28. Therefore, when the overlapped region is a planar surface, then its bird's-eye-view image will not be distorted, and the correlation coefficient y obtained through this calculation is greater than its threshold value of 0.5, thus it means that an obstacle does not exist in the overlapped region.

Figure 4:
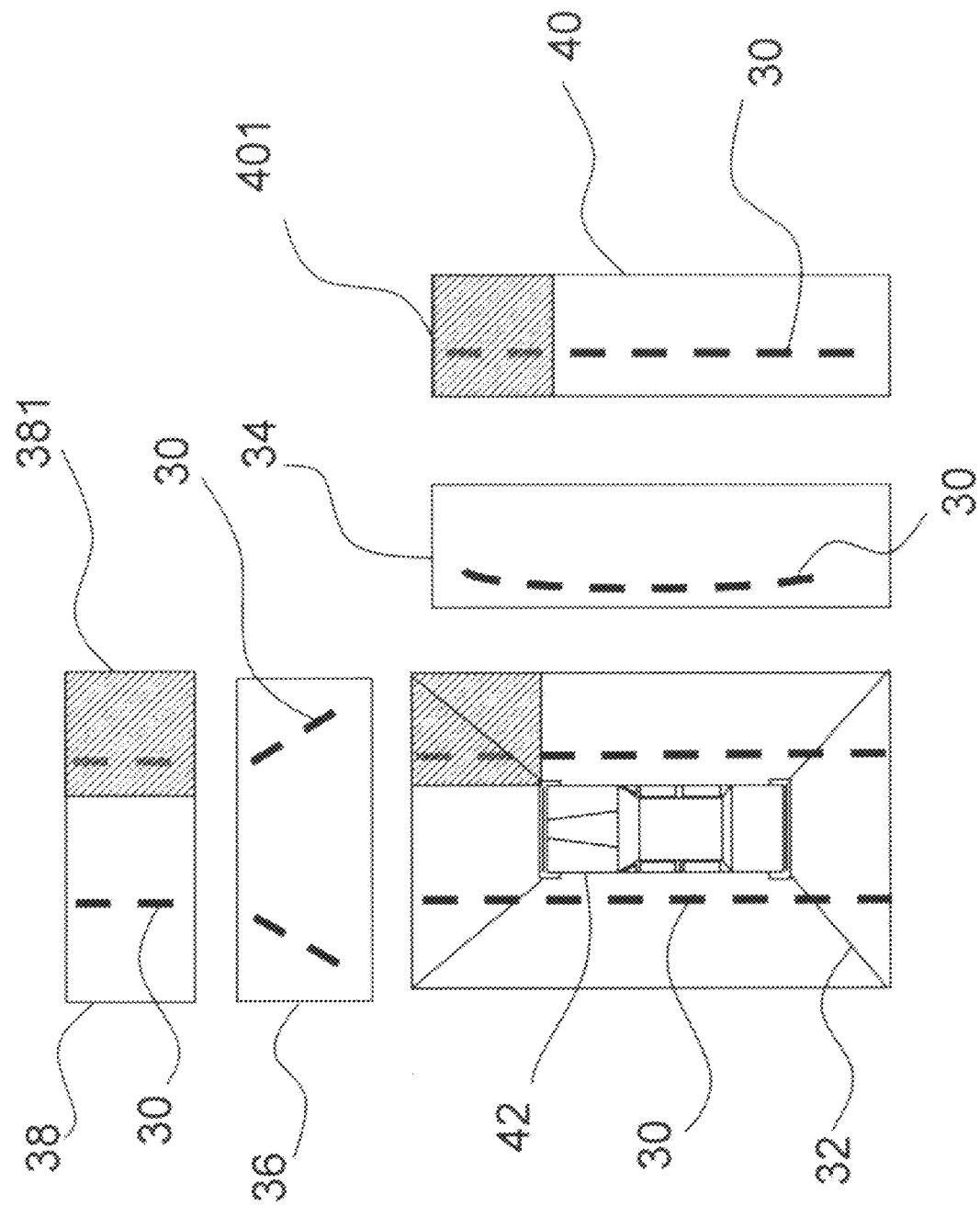
FIG. 4 is a schematic diagram of determining that no obstacle exists in a surrounding bird's-eye-view image of a vehicle according to an embodiment of the present invention.

Refer to FIG. 4 for a schematic diagram of determining that no obstacle exists in a surrounding bird's-eye-view image of a vehicle according to an embodiment of the present invention. As shown in FIG. 4, there are no obstacles in the perimeter of the vehicle, on two sides of vehicle 42 is a vehicle driving assistance line 30 respectively on the surface of ground, and in the drawing are shown four stitching lines 32 of the bird's-eye-view image. In determining if an obstacle exists, a camera disposed in the front of the vehicle is used to fetch a front original image 36 of vehicle 42, and a camera on right side of vehicle is used to fetch a right side original image 34 of a vehicle 42, then these two images are transformed separately into the two independent bird's-eye-view images 38 and 40 through an image processor 14. In FIG. 4, the overlapped regions 381 and 401 belong to the front and right side bird's-eye-view images respectively after transformation, and an obstacle detection unit is used to calculate and determine the correlation of images of the overlapped regions in the bird's-eye-view images of two adjacent regions. Since in this example, the overlapped regions 381 and 401 are of planar road surface, and the result of determination is that their correlation is high, and that means that there is no obstacle in the overlapped region.

Figure 5:
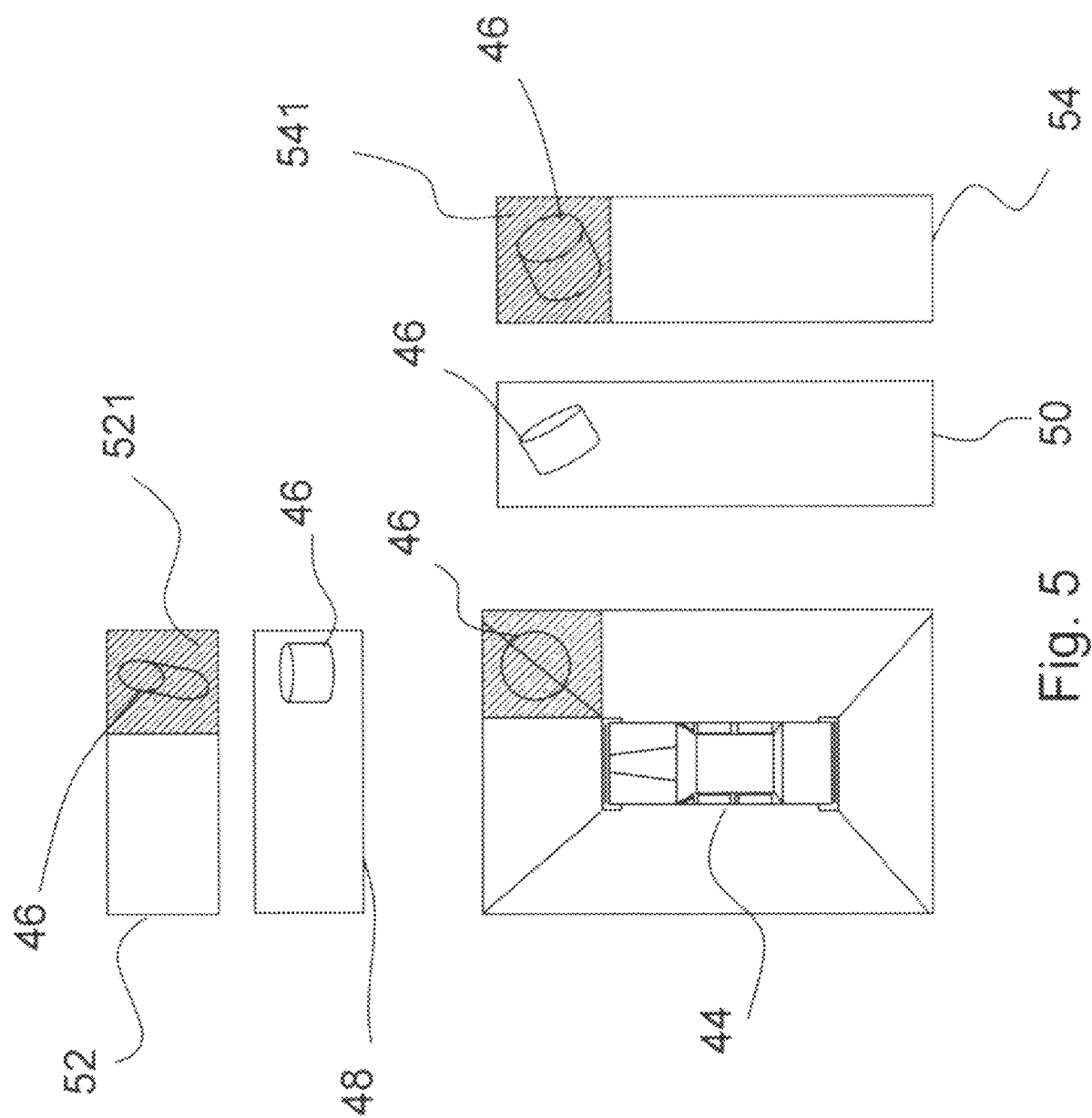
FIG. 5 is a schematic diagram of determining that an obstacle does exist in a surrounding bird's-eye-view image of a vehicle according to an embodiment of the present invention.

Then, refer to FIG. 5 for a schematic diagram of determining that an obstacle does exist in a surrounding bird's-eye-view image of a vehicle according to an embodiment of the present invention, likewise, a front original image and a side original image of vehicle 44 are taken as an example. When a cylindrical obstacle 46 appears at front right of vehicle 44, the original images 48 and 50 fetched by image fetching devices 10 are transformed into two independent bird's-eye-view images 52 and 54, since the cylindrical obstacle 46 has a certain height, therefore, after transforming, the image of the cylindrical obstacle 46 will be distorted, thus resulting in low correlation between the overlapped regions 521 and 541 of the two bird's-eye-view images 52 and 54, as such, it can be determined that an obstacle does exist in the overlapped regions.

Through the process of image processing mentioned above, in the present invention, the overlapped regions can be set to be the visual dead angle of a vehicle driver, the existence of obstacles can be known through the result of overlapped region correlation determination.

In addition, in the present invention, the variations of correlation coefficients of the overlapped regions can be utilized to determine the position of obstacles. In this respect, the embodiment mentioned above is taken as an example. Firstly, the correlation coefficients of the nine sub-regions of the overlapped regions of two bird's-eye-view images are calculated and obtained, in case that an obstacle is in a sub-region of overlapped regions, then its correlation coefficient would be rather small. In contrast, in case that the obstacle is not in this and other sub-regions of the overlapped regions, then its correlation coefficient would be large. In other words, in an overlapped region, from a sub-region not having an obstacle to a sub-region having an obstacle, the related correlation coefficients will present a sudden and drastic decrease due to the emergence of an obstacle. Therefore, this characteristic can be used to calculate the closest distance from an obstacle to the vehicle, such that to the shortcomings of the prior art concerning dead angle of a camera and distortion of the transformed bird's-eye-view image, in the present invention, the correlation coefficients of the transformed bird's-eye-view images are compared, so as to obtain an accurate position of an obstacle. Compared with the prior art, the present invention can be utilized to further enhance the obstacle detection efficacy of the bird's-eye-view imaging technology. Moreover, in order to make the output bird's-eye-view image to have more touches of human flavor, improvements are made in the surrounding bird's-eye-view image processing method of the present invention.

In the following, the surrounding bird's-eye-view imaging technology of the present invention is described in further details. The special characteristic of the present invention is that, a set of correspondence tables are added. Therefore, upon the completion of overall system equipment installation, a correspondence table is first set-up specifying the spatial information about the position of each of the cameras on a vehicle, and also specifying the coordinate transformation information concerning virtual viewpoint variations corresponding to the steering-wheel-turning angle of each interval (5 degrees, 10 degrees, 15 degrees, . . . ). Therefore, a correspondence table is recorded the transformation of a unit point in an original image to a unit point in a bird's-eye-view image. As such, upon obtaining images by an image fetching device 10, a steering-wheel-turning-angle signal is utilized in selecting an appropriate correspondence table, then the images thus obtained are processed by utilizing such a correspondence table, thus enabling speedy processing of image signals. As such, this bird's-eye-view image transformation and calculation method is realized through the following: a camera coordinate transformation matrix, a virtual viewpoint coordinate transformation matrix, a perspective transformation formula, and an inverse perspective transformation formula, hereby obtaining a two-dimensional vehicle surrounding bird's-eye-view image.

Figure 6:
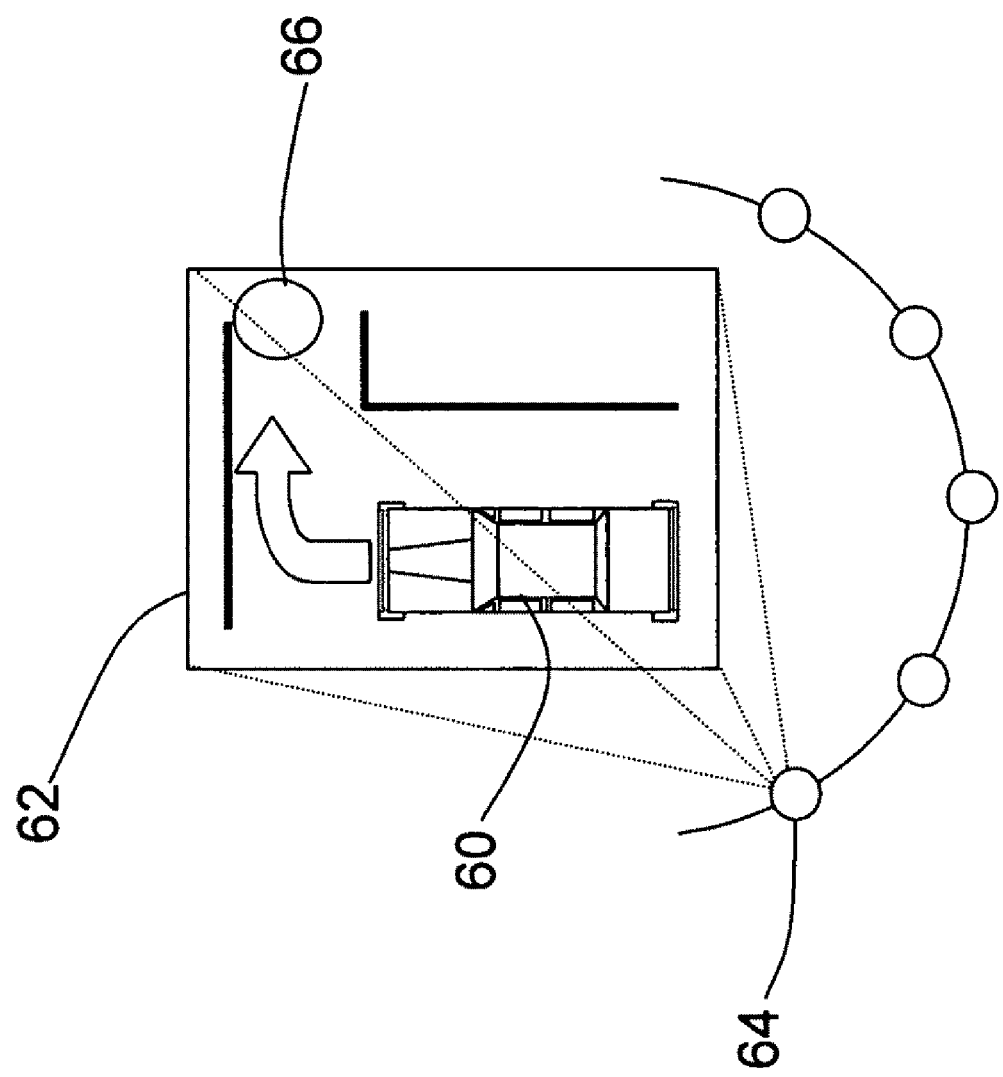
FIG. 6 is a schematic diagram of a surrounding bird's-eye-view image having variable visual angle according to an embodiment of the present invention.

By way of example, when a driver in control of a vehicle makes a turn to the right, as shown in FIG. 6, then upon receiving an image of signal of the vehicle 60 by an image processor, the image will be transformed by utilizing a correspondence table set up in advance, thus the image processor may provide the vehicle driver with a maximum region in a surrounding bird's-eye-view image scope 62 presented at the front right position of the head of the vehicle, with its virtual visual angle 64 at a rear left position of the vehicle, thus it may perform detection of obstacle 66 in such a surrounding bird's-eye-view image scope. The technical characteristic mentioned above is indeed an advantage of the present invention, since, usually, not all the obstacles in the surroundings of a vehicle may pose threats to that vehicle, such that the obstacle detection unit does not have to monitor all the scope in the surroundings of a vehicle. In the present invention, only an specific obstacle detection scope in the vehicle driving direction has to be detected and calculated, so that the method and scope of obstacle detection can be realized more economically and intelligently.

Figure 7:
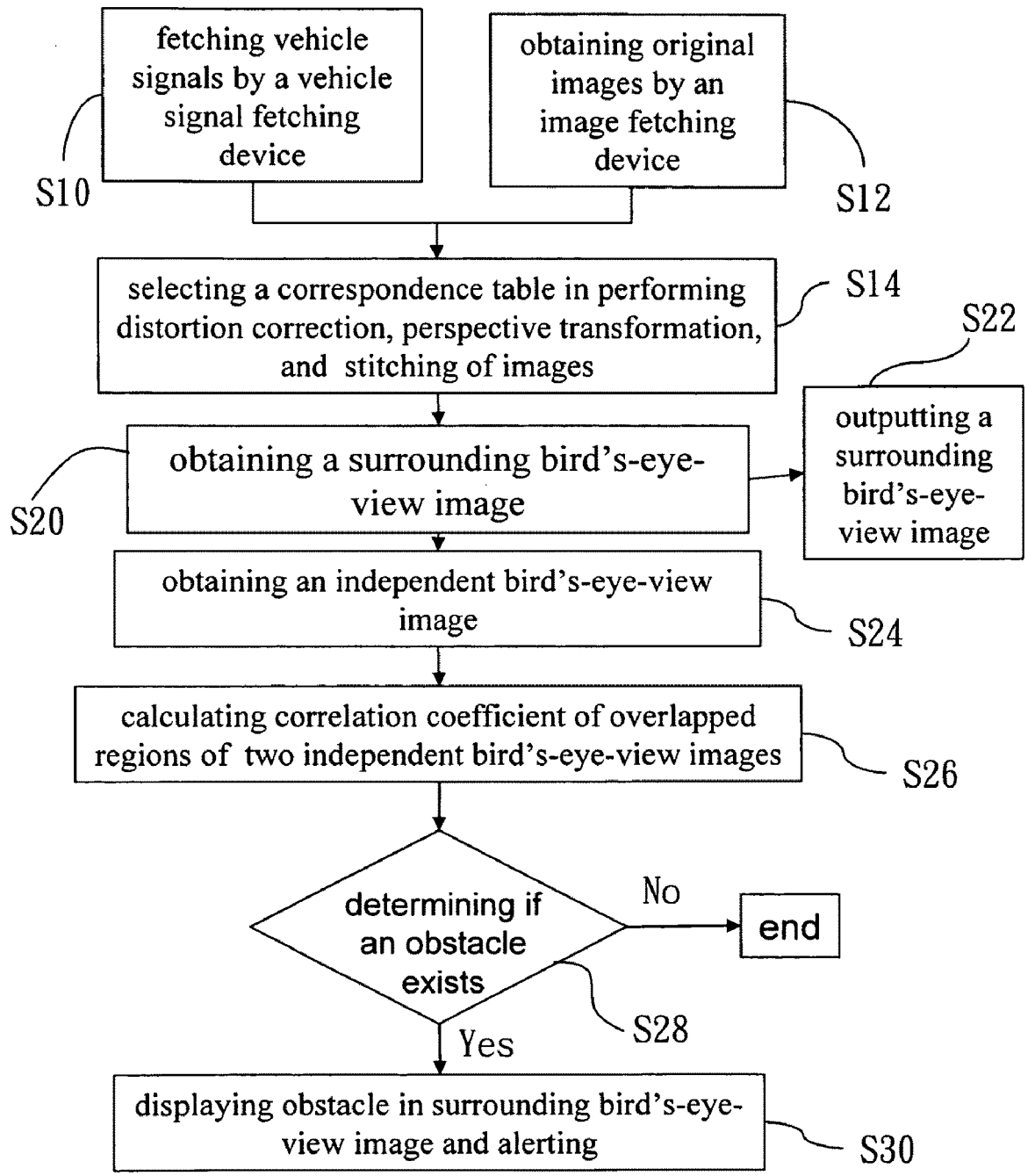
FIG. 7 is a flowchart of the steps of an obstacle determination method implemented through utilizing bird's-eye-view images according to an embodiment of the present invention.

Refer to FIG. 7 for a flowchart of the steps of an obstacle determination method implemented through utilizing bird's-eye-view images according to an embodiment of the present invention. As shown in FIG. 7, the obstacle determination method comprises the following steps: firstly, in step S10, a vehicle signal fetching device 12 is used to fetch a vehicle signal, wherein, the vehicle signal can be a vehicle steering-wheel-turning-angle signal, a gear shift signal, or a vehicle speed signal; next, in step S12, the image fetching devices 10 installed on the vehicle is used to fetch 6 original images around the vehicle, wherein, the images fetched by two adjacent image fetching devices 10 contain images of at least an overlapped region; then, in step S14, upon obtaining the original images and the vehicle signals, the image processor 14 is used to select a correspondence table 141 based on the vehicle signal, wherein, the selected correspondence table is used to perform image distortion correction, image perspective transformation, and images stitching, so as to create a surrounding bird's-eye-view image; subsequently, in step S20, obtaining the surrounding bird's-eye-view image; then, in step S22, a displayer 16 is used to output the surrounding bird's-eye-view image; subsequently, in step S24, the image processor 14 is used to transform the six original images into the respective independent bird's-eye-view images; then in step S26, an obstacle detection unit 18 is used to determine the correlation of the overlapped regions in the independent bird's-eye-view images of two adjacent regions. In the present embodiment, firstly, the overlapped regions are divided into a plurality of sub-regions, and the correlation coefficient of the sub-regions is calculated according to the following formula:

$$\gamma = \frac{\sum_s \sum_t [f(s,t)-\bar{f}][w(s,t)-\bar{w}]}{\left\{\sum_s \sum_t [f(s,t)-\bar{f}]^2 \sum_s \sum_t [w(s,t)-\bar{w}]^2\right\}^{1/2}}$$

wherein, f(s,t) and w(s,t) represent respectively gray level values for images of the sub-regions of the overlapped regions in the independent bird's-eye-view images of two adjacent regions; and $\bar{f}$ and $\bar{w}$ are respectively the average gray level values for images of the sub-regions of the overlapped regions in the independent bird's-eye-view images of two adjacent regions; then, in step S28, determining if obstacles do exist based on the calculation result that whether the correlation coefficient is less than a threshold value, in case that the correlation coefficient is greater than the threshold value, then it means that the obstacles do not exist in the overlapped region, otherwise, in case that the correlation coefficient is less than the threshold value, then it means that the obstacles do exist in the overlapped region; and finally in step S30, in case that an obstacle does exist, then marking the obstacle on the surrounding bird's-eye-view image, and alerting the vehicle driver to pay attention to the obstacle, and in case that there exists no obstacle, then the process flow ends.

Through the description mentioned above, it is evident that, the objective of the present invention is to overcome and improve the shortcomings of the prior art that in the image stitching position, an obstacle can not be displayed due to the existence of a dead angle. In the present invention, distortion could occur after transformation of original images into a surrounding bird's-eye-view image for an obstacle existing in the overlapped region, however, this distortion is otherwise utilized as a means of determining the position of an obstacle. Wherein, two original images having overlapped regions are converted separately into respective bird's-eye-view images, then the overlapped regions of the two bird's-eye-view images are compared for their correlation, in case that the correlation is low, then an obstacle does exist in the overlapped region, and then sub-regions are analyzed in detail in determining accurately the position of the obstacle. Therefore, in the present invention, the cost and installation of radar, ultrasonic device, or other detection equipment can be saved, and the shortest distance from an obstacle to a vehicle can be obtained through merely utilizing an imaging transformation technology. In addition, in order to enlarge the detection scope when a driver backups or turns around the vehicle, in an image transformation technology of the present invention, a plurality of correspondence tables are utilized in transforming original images into surrounding bird's-eye-view images. Wherein, each of the correspondence tables contains space transformation information for each of the vehicle driving conditions. Therefore, in the present invention, the virtual visual angles of surrounding bird's-eye-view images can be varied based on the actual driving conditions, and the obstacle detection range can be changed along with the variations of virtual visual angles, as such, realizing a more humanized vehicle driving assistance device and method. Therefore, through the application of the present invention, a vehicle driver may obtain the surrounding bird's-eye-view images of a vehicle of various visual angles, when he drives straight forward, turns around, or backups the vehicle, such that he may drive a vehicle more safely on the road.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. An obstacle determination system implemented through utilizing bird's-eye-view images, comprising: a plurality of image fetching devices, installed on a vehicle and that are used to obtain a plurality of images around said vehicle; an image processor, used to convert said images respectively into a plurality of independent bird's-eye-view images, wherein, said independent bird's-eye-view images of two adjacent regions contain said image of an overlapped region; and an obstacle detection unit, used to compare correlation of said overlapped regions in said independent bird's-eye-view images of said two adjacent regions, and determine existence of an obstacle based on said correlation, said obstacle detection unit being used to divide said overlapped region in said independent bird's-eye-view images of said two adjacent regions into a plurality of sub-regions, calculate and obtain a correlation coefficient of said sub-region of said overlapped regions in said independent bird's-eye-view images of said two adjacent regions, and determine if said obstacle exists in said sub-region based on said correlation coefficient, hereby obtaining a distance between said vehicle and said obstacle.

2. The obstacle determination system implemented through utilizing bird's-eye-view images as claimed in claim 1, further comprising:
a vehicle signal fetching device, used to fetch a steering-wheel-turning-angle signal, a vehicle speed signal, or a gear shifting signal, said image processor is used to transform and obtain a surrounding bird's-eye-view image based on signals fetched by said vehicle signal fetching device, a virtual visual angle of said surrounding bird's-eye-view image can be varied based on variations of said steering-wheel-turning-angle signal of said vehicle.

3. The obstacle determination system implemented through utilizing bird's-eye-view images as claimed in claim 2, wherein
said image processor further includes a plurality of correspondence tables, said correspondence tables are used to perform image distortion correction, image perspective transformation, and images stitching, thus obtaining said transformed surrounding bird's-eye-view image.

4. The obstacle determination system implemented through utilizing bird's-eye-view images as claimed in claim 2, wherein
said image processor further includes a plurality of correspondence tables, that contain space transformation information relating to said steering-wheel-turning angle of said vehicle and a position of said image fetching device.

5. The obstacle determination system implemented through utilizing bird's-eye-view images as claimed in claim 2, further comprising:
a displayer, electrically connected to said image processor, said displayer is used to output said surrounding bird's-eye-view image, and mark a position of said obstacle in said surrounding bird's-eye-view image.

6. The obstacle determination system implemented through utilizing bird's-eye-view images as claimed in claim 5, wherein
said displayer is used to display vehicle driving assistance lines or parking assistance lines around said vehicle.

7. The obstacle determination system implemented through utilizing bird's-eye-view images as claimed in claim 1, wherein
a formula of calculating said correlation coefficient is as follows:

$$\gamma = \frac{\sum_s \sum_t [f(s,t) - \bar{f}][w(s,t) - \bar{w}]}{\left\{ \sum_s \sum_t [f(s,t) - \bar{f}]^2 \sum_s \sum_t [w(s,t) - \bar{w}]^2 \right\}^{1/2}}$$

wherein, f(s,t) and w(s,t) represent respectively gray level values for images of said sub-regions of said overlapped regions in said independent bird's-eye-view images of said two adjacent regions; and $\bar{f}$ and $\bar{w}$ are average gray level values for images of said sub-regions of said overlapped regions in said independent bird's-eye-view images of said two adjacent regions.

8. The obstacle determination system implemented through utilizing bird's-eye-view images as claimed in claim 1, further comprising:
an alarm device, such as a light-emitting-diode (LED), a buzzer or a loudspeaker, and that is used to send out alarm signals in reminding a driver to pay attention to said obstacle.

9. The obstacle determination system implemented through utilizing bird's-eye-view images as claimed in claim 1, wherein
said image fetching device can be a charge-coupled-display (CCD) camera or a composite metal-oxide-semiconductor (CMOS) camera.

10. An obstacle determination method implemented through utilizing bird's-eye-view images, comprising the following steps: fetching vehicle signals of a vehicle, selecting a corresponding correspondence table, and fetching a plurality of images around said vehicle, producing a surrounding bird's-eye-view image based on said correspondence table, wherein, said image of two adjacent regions contain an overlapped region; transforming said images respectively into a plurality of independent bird's-eye-view images; determining correlation of said overlapped region in said independent bird's-eye-view images of two adjacent regions, said correlation determination including: dividing said overlapped region in said independent bird's-eye-view images of said two adjacent regions into a plurality of sub-regions, and calculating a correlation coefficient for said sub-regions of said overlapped region in said independent bird's-eve-view images of said two adjacent regions; determining if an obstacle exists in said sub-region as based on said correlation coefficient; and if said obstacle does exist in said overlapped region, obtaining a distance between said vehicle and said obstacle and then marking said obstacle in said surrounding bird's-eye-view image.

11. The obstacle determination method implemented through utilizing bird's-eye-view images as claimed in claim 10, wherein
a virtual viewpoint of said surrounding bird's-eye-view image can be varied according to a steering-wheel-turning-angle signal.

12. The obstacle determination method implemented through utilizing bird's-eye-view images as claimed in claim 10, wherein
a formula of calculating said correlation coefficient is as follows:

$$\gamma = \frac{\sum_s \sum_t [f(s,t) - \bar{f}][w(s,t) - \bar{w}]}{\left\{\sum_s \sum_t [f(s,t) - \bar{f}]^2 \sum_s \sum_t [w(s,t) - \bar{w}]^2\right\}^{1/2}}$$

wherein, f(s,t) and w(s,t) represent respectively gray level values for images of said sub-regions of said overlapped regions in said independent bird's-eye-view images of said two adjacent regions; and $\bar{f}$ and $\bar{w}$ are average gray level values for images of said sub-regions of said overlapped regions in said independent bird's-eye-view images of said two adjacent regions.

13. The obstacle determination method implemented through utilizing bird's-eye-view images as claimed in claim 10, wherein
said correspondence table contains space transformation information set up as based on said vehicle signal and a position of said image fetching device.

14. The obstacle determination method implemented through utilizing bird's-eye-view images as claimed in claim 10, wherein
said vehicle signal includes: a steering-wheel-turning-angle signal, a gear-shift signal, or a vehicle speed signal.

* * * * *